United States Patent Office 3,577,422
Patented May 4, 1971

3,577,422
4-[ω-[4-(2-, OR 3-HALO-p-TOLYL) - 1-PIPERAZINYL] ALKOXY] - β,β - DIMETHYLHYDROCINNAMIC ACID ESTERS
Norman E. Wideburg and Laura H. Miller, Waukegan, Ill., assignors to Abbott Laboratories, North Chicago, Ill.
No Drawing. Continuation of application Ser. No. 717,392, Mar. 29, 1968. This application Apr. 10, 1968, Ser. No. 720,348
Int. Cl. C07d 51/70
U.S. Cl. 260—268          4 Claims

ABSTRACT OF THE DISCLOSURE

Newly synthesized 4-[ω-[4-(2-, or 3-halo p-tolyl)-1-piperazinyl]alkoxy] - β,β - dimethylhydrocinnamic acid esters useful for chemotherapeutically reducing the number of flukes of genus Schistosoma present in infected warm-blooded animals have been found to alleviate symptoms of schistosomiasis. These esters have the structural formula

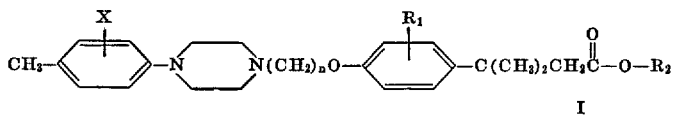

wherein X is a halogen; $n$ is an integer of from 3 to 6; $R_1$ is hydrogen or lower alkoxy; and $R_2$ is methyl, ethyl, or a straight or branched chain alkyl radical of up to 5 carbon atoms. The esters are prepared by microbiologically oxidizing a 1-(2-, or 3-halo-p-tolyl)-4-[ω-(p-tert-pentylphenoxy) alkylene]piperazine to the corresponding hydrocinnamic acid and then esterifying the acid.

---

This is a continuation of application Ser. No. 717,392, filed Mar. 29, 1968, and now abandoned.

DESCRIPTION OF INVENTION

This invention relates to new and useful 4-[ω-]4-(2-, or 3-halo-p-tolyl)-1-piperazinyl[alkoxy]-β,β-dimethylhydrocinnamic acids and esters and to methods for their preparation.

More particularly, this invention relates to compounds of Formula I

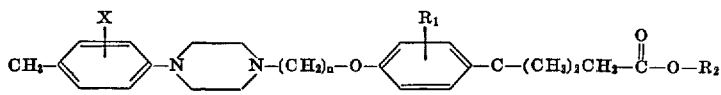

wherein, as elsewhere in this specification, X represents a halogen radical, preferably chlorine or bromine; $n$ is an integer of from 3 to 6; $R_1$ represents hydrogen or an alkoxy radical of from 1 to 4 carbon atoms; and $R_2$ represents hydrogen, methyl, ethyl, or a straight or branched chain alkyl radical consisting of from 3 to 5 carbon atoms. The acids wherein $R_2$ is hydrogen are intermediates for the esters wherein $R_2$ is other than hydrogen as defined above.

When mice infected with *S. mansoni* are orally administered the esters of this invention with a dosage of from 12.5 to 50 mg./kg. of body weight for 5 consecutive days, a substantial reduction of the worms responsible for the infection results. This result is evidenced by an examination of the livers, mesenteric and portal veins following sacrifice of the mice.

The compounds of this invention can be prepared by a microbiological process in which a 1-(2-, or 3-halo-p-tolyl)-4-[ω-(p-tert-pentylphenoxy)alkylene]piperazine of Formula II

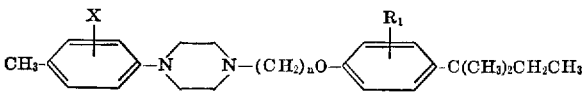

is oxidized to the corresponding hydrocinnamic acid derivative of Formula I, where $R_2$ is hydrogen. The hydrocinnamic acid derivatives can then be esterified by conventional methods.

The esters of this invention are active schistosomicidal agents which can be used in the free base form or in the form of chemotherapeutically acceptable acid-addition salts. Examples of such acid-addition salts are the hydrochloride, hydrobromide, hydroiodide, nitrate, phosphate, sulfate, sulfamate, acetate, citrate, tartrate, lactate, fumarate, pamoate, and the like.

The substrates (Formula II) for the microbiological process can be prepared by reacting a halotolyl-substituted piperazine of Formula III

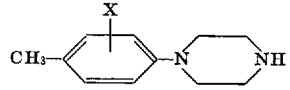

with a ω-(p-tert-pentylphenoxy)alkylene halide, preferably the chloride or the bromide, of Formula IV

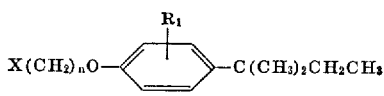

The compounds represented by Formulae II, III and IV are well known to the prior art. A scheme for producing these compounds, including explicit examples thereof, is set forth in U.S. Patent 3,270,004.

The microorganism employed in the microbiological process may be selected from the order Monilialies, the family Moniliacea, and the genera Trichoderma or Penicillium. The preferred microorganisms are Trichoderma sp. NRRL 3304 and *Penicillium lilacinum* NRRL 895. Cultures of these microorganisms, available to the public, can be obtained from the Northern Utilization Research and Development Division, United States Department of Agriculture, Peoria, Ill. 61604.

The microorganisms can be maintained by bi-monthly transfers on a solid medium consisting of the infusion from 500 g. of potatoes, 10 g. of glucose, and 20 g. of agar per liter of medium.

The microbiological oxidation can be accomplished by the following procedure. The desired microorganism is cultured aerobically in a medium favorable to its growth. A suitable medium has the following composition:

soy flour—5 g.
yeast extract—5 g.

$KH_2PO_4$—2.3 g.
$K_2HPO_4$—0.84 g.
glucose solution (50% wt./vol.)—0.1 liter
deionized water—1 liter The medium is sterilized by autoclaving at 121° C. for 30 minutes. The glucose solution is autoclaved separately. Other nitrogen sources may be used in place of the soy flour and yeast extract. Examples are corn meal, oat meal, meat extracts, corn steep liquor, distillers' solubles, protein hydrolysates, peptones, amino acids, urea, nitrates, and ammonium compounds. Other carbon sources may be used in place of glucose. Examples are fructose, sucrose, maltose, lactose, molasses, dextrines, starches, animal or vegetable oils, fatty acids, and glycerol. The addition of a saturated hydrocarbon, such as tetradecane, to the culture at a level between 5 and 20 grams/liter sometimes improves the yield of the desired product.

The pH of the medium before inoculation may vary between 5.0 and 7.5. The preferred temperature for growth is between 25 and 32° C.

The substrate may be added to the culture between 0 and 96 hours after inoculation. The preferred time is after a heavy growth of mycelium has been obtained. The substrate may be added as a finely divided solid or as a solution in a small volume of a water miscible solvent such as methanol, acetone, dimethylformamide, or dimethylsulfoxide. The preferred range of concentration of substrate in the culture is between 0.1 and 10 grams/liter.

The progress of the microbiological oxidation can be determined as follows. A 10 ml. aliquot of the whole culture is removed from the fermentation vessel and mixed with 10 ml. of acetone.

The sample is then extracted with 20 ml. of ethyl acetate. The extract is evaporated to dryness and the residue is dissolved in 2 mol. of a solvent consisting of 1 part methanol and 1 part chloroform. A 50 microliter aliquot of this solution is applied to a chromatographic plate coated with a 0.5 mm. layer of silica gel GF. The chromatographic plate is then developed with a solvent composed of 75 parts chloroform, 25 parts methanol, and 4 parts ammonium hydroxide. After development, the chromatographic plate may be viewed under ultraviolet light. The substrate and product are visible as dark spots on a green fluorescent background. The chromatographic plate may also be sprayed consecutively with 2 N sulfuric acid and a solution consisting of 18 g. of potassium iodide, 2 g. of chloroplatinic acid, and sufficient distilled water to make 1 liter. The substrate and product are then visible as purple spots on a pink background.

At the time of maximum yield, the desired product may be separated from the culture by extracting the whole culture at an appropriate pH with a water immiscible solvent such as petroleum ether, methylene, chloride, or ethyl acetate. Alternatively, the whole culture can be extracted with a mixture of one of the previously named solvents and acetone. The crude hydrocinnamic acid derivative obtained upon evaporation of the solvent can be purified by chromatography and/or recrystallization. The hydrocinnamic acid derivative can then be esterified by reaction with an excess of the desired alcohol in the presence of hydrogen chloride.

The effects of the compounds of this invention against *Schistosoma mansoni* infections was determined in the following manner.

Female CF[1] mice were infected with the Puerto Rican strain of *S. mansoni* by exposure to 100 cercariae percutaneously from a harvest of cercariae from 25 or more infected *A. glabratus* to insure a uniform bisexual infection.

The mice were kept for six or seven weeks in groups of 50 per cage to permit the development of mature infections. Several mice were sacrificed at the end of this period to determine the worm burden and presence of eggs in the liver and intestines for each exposure group. The mice were then divided into groups of 3 per cage and given the test compounds via gavage, utilizing a mouse cannula (20 gauge–1⅛" length). A non-medicated group of an equal number of mice served as infection controls.

Treatment consists of one oral dose per day in 5 consecutive days. The animals were sacrificed two weeks later, and the entire viscera was examined for presence of worms, alive or dead. The liver, lungs, and intestines were then pressed between two glass plates and examined microscopically for eggs and tissue changes resulting from infection or treatment. The total worm burden, dead or alive, and organ changes were compared with the non-medicated controls. The results of these tests on the specified compounds are set forth below.

TABLE

In vivo tests against *S. mansoni*

| Compound | Route | Dose, mg./kg. | Survival ratio | Average post mortem worm count in the— | | |
|---|---|---|---|---|---|---|
| | | | | Mesenteric vein | Portal vein | Liver |
| Methyl 4-[6-[4-(3-chloro-p-tolyl)-1-piperazinyl]hexyloxy]-β,β-dimethyl hydrocinnamate. | Oral | 50×5 | 3/3 | 0.3 | 1.6 | 0.6 |
| Do | do | 25×5 | 3/3 | 0.3 | 1.3 | 0.6 |
| Isopropyl 4-[6-[4-(3-chloro-p-tolyl)-1-piperazinyl]hexyloxy]-β,β-dimethyl hydrocinnamate. | do | 25×5 | 3/3 | 2.3 | 5.6 | 2.3 |
| Isobutyl 4-[6-[4-(3-chloro-p-tolyl)-1-piperazinyl]hexyloxy]-β,β-dimethyl hydrocinnamate. | do | 25×5 | 3/3 | 0.0 | 0.0 | 1.6 |
| Do | do | 12.5×5 | 3/3 | 0.3 | 1.0 | 0.0 |
| Do | I.P. | 25×5 | 3/3 | 6.6 | 4.0 | 3.0 |
| Non-medicated control | | | 3/3 | 25.0 | 3.3 | 2.6 |

Example 1.—Preparation of 4-[6-[4-(3-chloro-p-tolyl)-1-piperazinyl]hexyloxy]-β,β-dimethylhydrocinnamic acid A medium was prepared from 5 g. soy flour, 5 g. yeast extract, 2.3 g. $KH_2PO_4$, 0.84 g. $K_2HPO_4$, 100 ml. of a 50% wt./vol. glucose solution, and 1-liter of deionized water, adjusted to pH 6.5 and sterilized by autoclaving at 121° C. for 30 minutes. The glucose solution was autoclaved separately. 100 ml. of the sterilized medium contained in a cotton plugged 500 ml. Erlenmeyer flask was inoculated with a 72-hour vegetative growth of Trichoderma sp. NRRL 3304. The inoculum had been grown in the same medium. 100 such flasks were inoculated and incubated at 28° C. on a shaking machine rotating at a rate of 250 r.p.m. After 24 hours, 100 mg. of 1-(3-chloro-p-tolyl)-4-[6-(p-tert-pentylphenoxy)hexyl]piperazine hydrochloride was added to each flask. After an additional 13 days of incubation, the fermentation was terminated and the contents of the flasks were combined. The combined whole culture had an approximate volume of 10 liters. It was adjusted to a pH between 10 and 11 with sodium hydroxide, mixed with 7.5 liters of acetone, and extracted twice with 20 liters of petroleum ether (boiling point 30–60° C.) The petroleum ether extract contained residual substrate and was discarded. The raffinate was then adjusted to pH 7 with phosphoric acid and extracted 3 times with 20 liters of petroleum ether. A precipitate containing the desired product formed during the concentration of this petroleum ether extract. The precipitate was collected and crystallized from acetone-hexane to give 1.6 g. of crude product. The crude product was decolorized with activated carbon and recrystallized from acetone to give 1 g. of the desired 4-[6-[4-(3-chloro-p-tolyl)-1-piperazinyl]hexyloxy]-β,β-dimethylhydrocinnamic acid, M.P. 116–118° C. The melting points stated herein were determined with a Kofler micro hot stage.

Two minor impurities were observed when this product was examined by thin-layer chromatography (TLC) using silica gel GF as adsorbent and a developing solvent composed of 75 parts chloroform, 25 parts methanol, and 4 parts ammonium hydroxide. 2.5 g. of this product was further purified by preparative TLC in the system described above. The desired product was eluted from the silica gel with methanol and crystallized twice from acetone-water to give 1 g. of pure 4-[6-[4-(3-chloro-p-tolyl)-1-piperazinyl]hexyloxy]-β,β-dimethylhydrocinnamic acid, M.P. 117–119° C. The nuclear magnetic resonance spectra of this compound in deuterated chloroform and deuterated pyridine are consistant with the proposed structure.

*Analysis.*—Calculated for $C_{28}H_{39}ClN_2O_3$ (percent): C, 69.05; H, 8.07; Cl, 7.28; N, 5.75. Found (percent): C, 69.27; H, 8.05; Cl, 7.49; N, 5.29.

Example 2.—Preparation of methyl 4-[6-[4-(3-chloro-p-tolyl)-1-piperazinyl]hexyloxy]-β,β-dimethyl hydrocinnamate A 250 mg. portion of pure 4-[6-[4-(3-chloro-p-tolyl)-1-piperazinyl]hexyloxy]-β,β-dimethylhydrocinnamic acid, prepared as described in Example 1, was dissolved in 15 ml. methanol and acidified with gaseous hydrogen chloride. The esterification was complete after 5 minutes at room temperature. The solution was concentrated and diethyl ether added to precipitate 238 mg. of methyl 4-[6-[4 - (3 - chloro-p-tolyl)-1-piperazinyl]hexyloxy]-β,β-dimethylhydrocinnamate hydrochloride, M.P. 105–110° C.

Example 3.—Preparation of isobutyl 4-[6-[4-(3-chloro-p-tolyl) - 1-piperazinyl]hexyloxy]-β,β-dimethylhydrocinnamate A 350 mg. portion of pure 4-[6-[4-(3-chloro-p-tolyl-1-piperazinyl]hexyloxy]-β,β-dimethylhydrocinnamic acid was dissolved in 15 ml. of methylene chloride. 15 ml. of isobutyl alcohol was added and the solution was acidified with gaseous hydrogen chloride. After 5 days at room temperature, the methylene chloride was removed by vacuum distillation and an additional 5 ml. of isobutyl alcohol was added. The product crystallized overnight giving 179 mg. of isobutyl 4-[6-[4-(3-chloro-p-tolyl)-1-piperazinyl]hexyloxy]-β,β-dimethylhydrocinnamate hydrochloride, M.P. 117–120° C. Thin-layer chromatography revealed that the product contained a small amount of unreacted acid.

Example 4.—Preparation of isopropyl 4-[6-[4-(3-chloro-p-tolyl)-1-piperazinyl]hexyloxy - β,β - dimethylhydrocinnamate A 180 mg. portion of pure 4-[6-[4-(3-chloro-p-tolyl-1-piperazinyl]hexyloxy]-β,β-dimethylhydrocinnamic acid was dissolved in 25 ml. of isopropyl alcohol and acidified with gaseous hydrogen chloride. After 11 days at room temperature, the reaction was terminated and the ester was separated from unreacted acid by preparative TLC using silica gel GF as adsorbent and a developing solvent composed of 92 parts chloroform, 8 parts methanol, and 1 part ammonia hydroxide. The ester was eluted from the silica gel with methanol. The eluate was evaporated to dryness. The residue was dissolved in chloroform, filtered, and again evaporated to dryness. The residue was dissolved in diethyl ether and ethereal hydrogen chloride was added to the solution to precipitate 105 mg. of isopropyl 4 - [6-[4-(3-chloro-p-tolyl)-1-piperazinyl]hexyloxy]-β,β-dimethylhydrocinnamate hydrochloride, M.P. 114–121° C.

We claim:
1. A compound of the formula

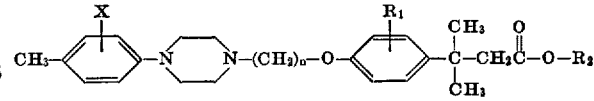

wherein $n$ is an integer of from three to six; $R_1$ is selected from the group consisting of hydrogen and lower alkoxy; $R_2$ is selected from the group consisting of hydrogen and a straight and branched alkyl radical of from 1 to 5 carbon atoms; and X is a halogen selected from the group consisting of chlorine and bromine.

2. A compound according to claim 1 in which X is chlorine, and $R_2$ is selected from the group consisting of methyl, isobutyl, isopropyl and neopentyl.

3. A compound according to claim 2 in which $n$ is six.

4. A compound according to claim 3 in which $R_1$ is hydrogen.

References Cited
UNITED STATES PATENTS

| | | | |
|---|---|---|---|
| 2,945,860 | 7/1960 | Schmidt-Barbo et al. | 260—268 |
| 3,270,004 | 8/1966 | Alter | 260—268X |
| 3,277,094 | 10/1966 | Werner | 260—268 |
| 3,379,620 | 4/1968 | Archer | 260—268X |

DONALD G. DAUS, Primary Examiner

U.S. Cl. X.R.

195—51; 424—250

UNITED STATES PATENT OFFICE
CERTIFICATE OF CORRECTION

Patent No. 3,577,422                    Dated May 4, 1971

Inventor(s)

It is certified that error appears in the above-identified patent and that said Letters Patent are hereby corrected as shown below:

Column 3, line 67, please delete the "comma" (,) following the word "methylene".

Column 6, line 2, please insert a "bracket" ( ] ) following the word "hexyloxy".

Column 6, line 30 in Claim 1, please delete the word "radical" and substitute therefor the word "group".

Column 6, Claim 1, line 32, following the last word "bromine" in the sentence, please insert the following --and chemotherapeutically acceptable addition salts thereof--

Signed and sealed this 19th day of October 1971.

(SEAL)
Attest:

EDWARD M. FLETCHER, JR.          ROBERT GOTTSCHALK
Attesting Officer                Acting Commissioner of Patents